Dec. 27, 1932.  G. LAMBERT  1,892,243
LOADING ATTACHMENT FOR TRUCKS
Filed Nov. 21, 1931  5 Sheets-Sheet 1
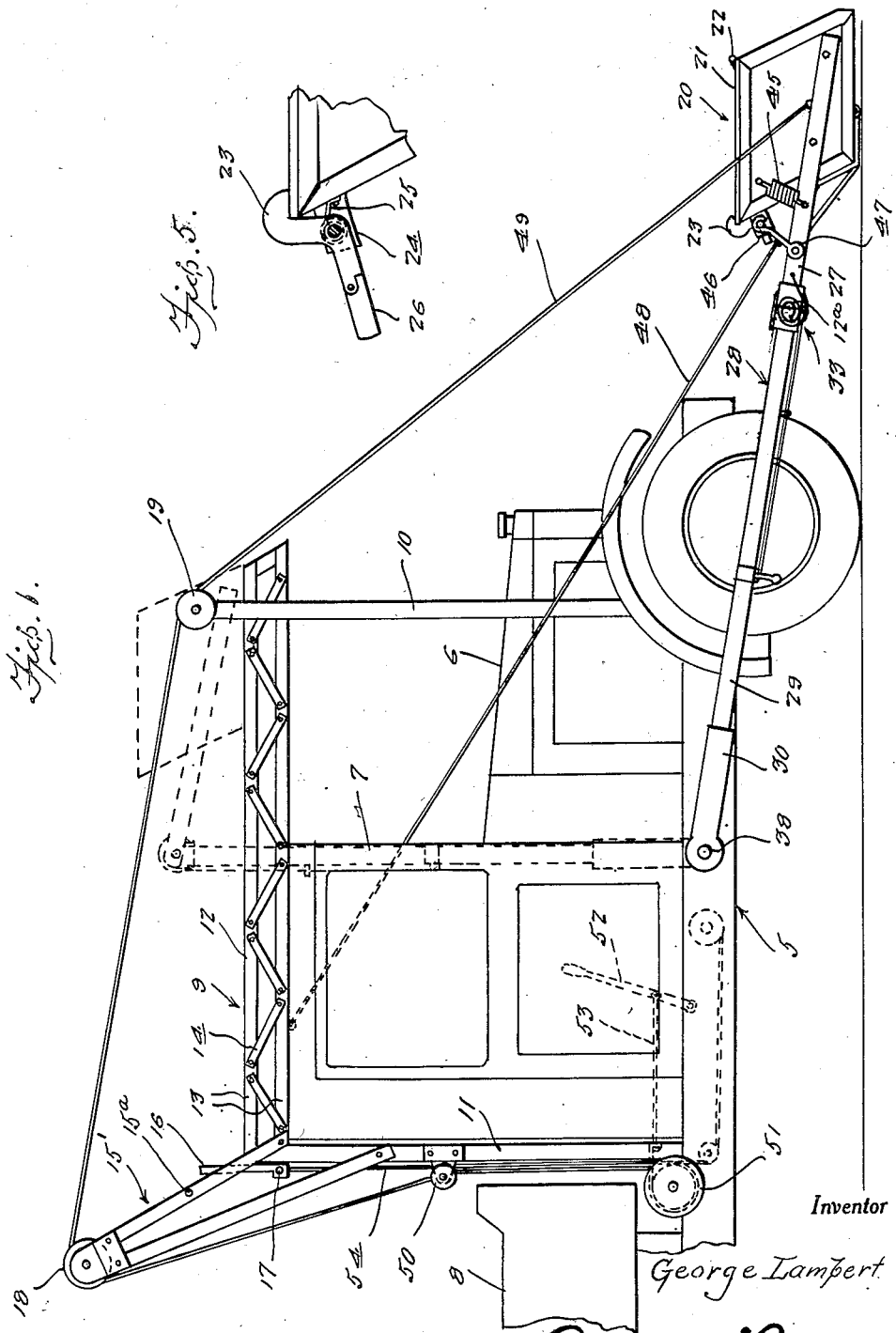
Inventor
George Lambert
By Clarence A. O'Brien
Attorney

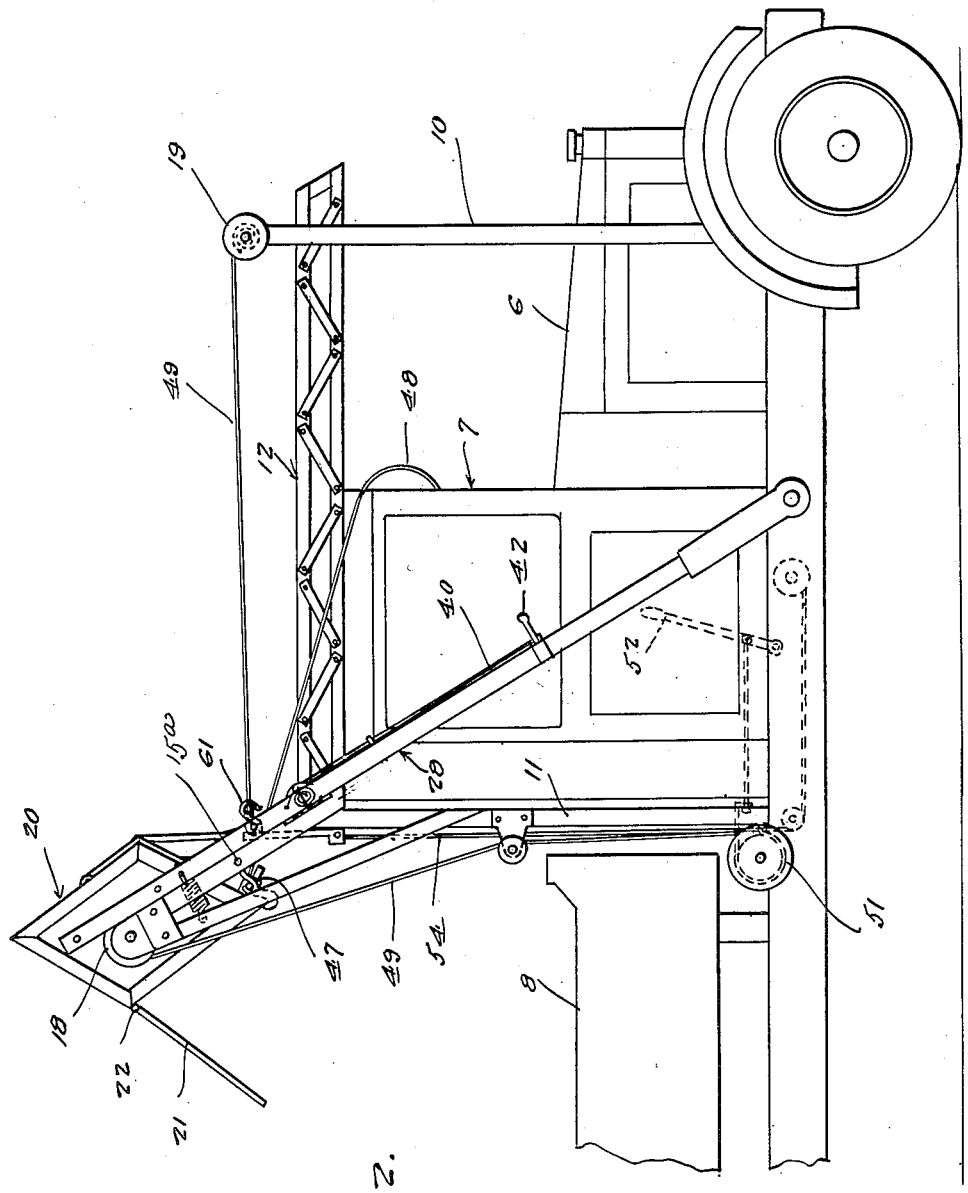

Dec. 27, 1932.  G. LAMBERT  1,892,243
LOADING ATTACHMENT FOR TRUCKS
Filed Nov. 21, 1931   5 Sheets-Sheet 3
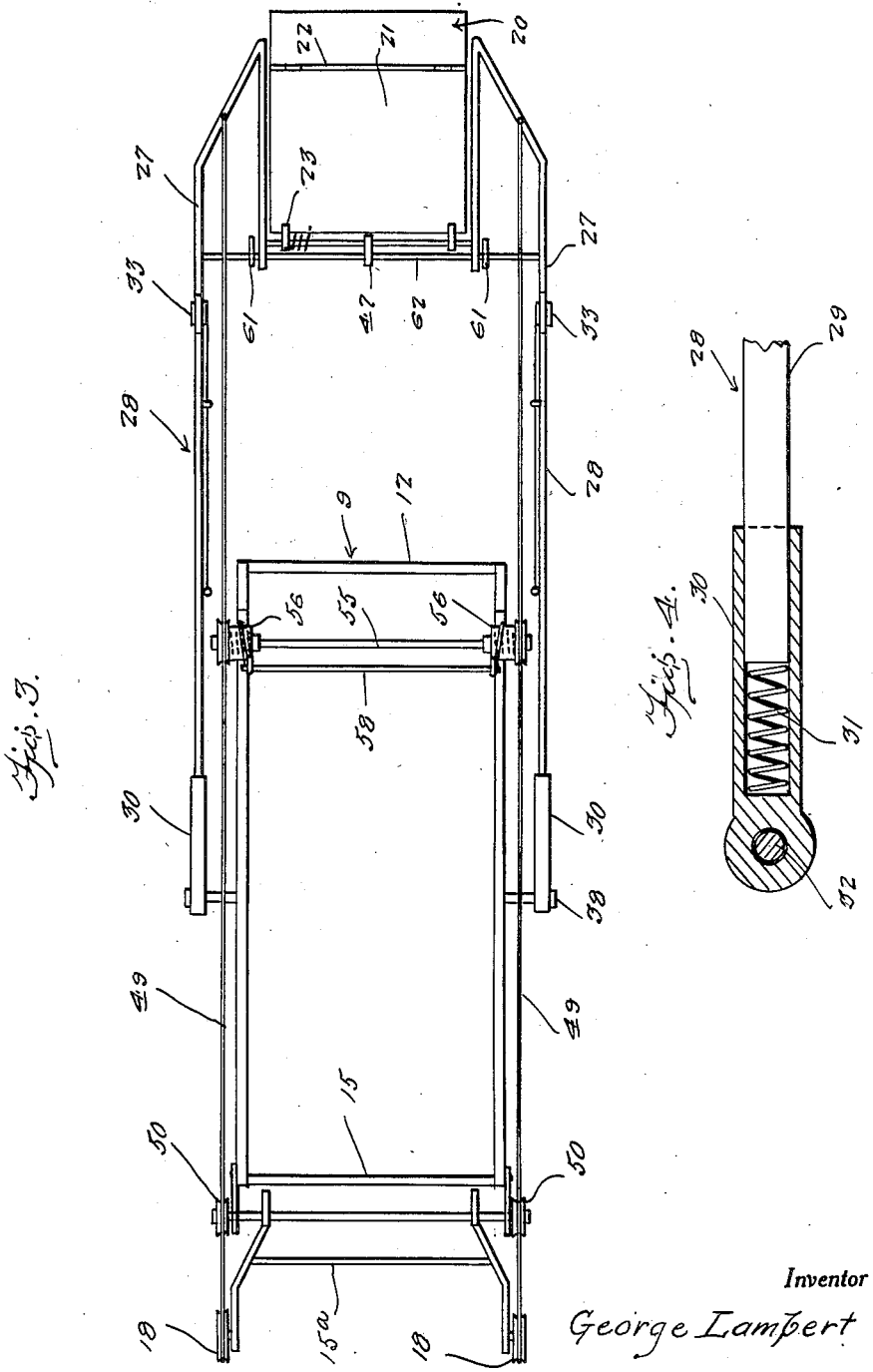
Inventor
George Lambert
By Clarence A O'Brien
Attorney

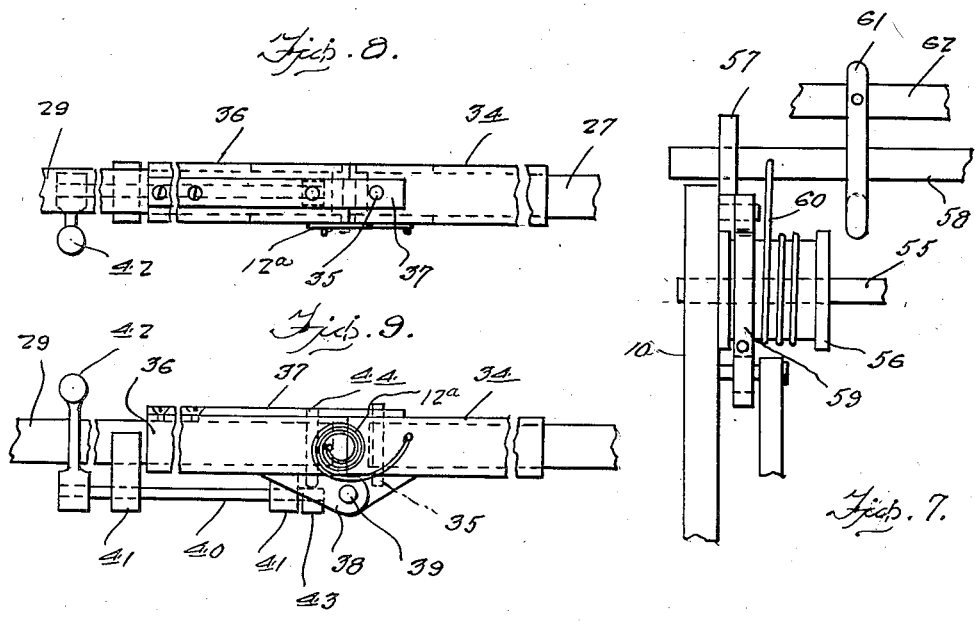

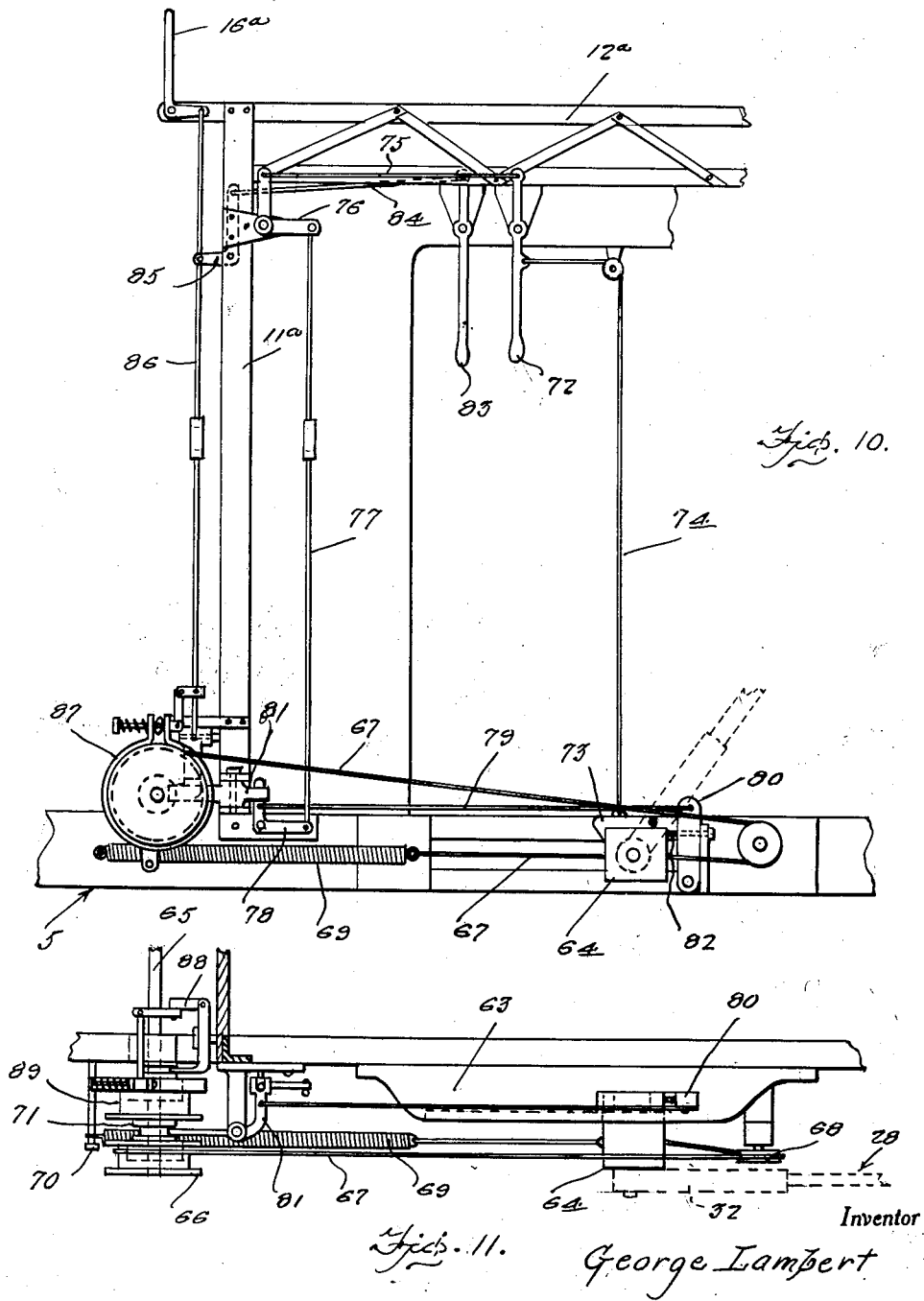

Patented Dec. 27, 1932

1,892,243

UNITED STATES PATENT OFFICE

GEORGE LAMBERT, OF NORWICH, CONNECTICUT

LOADING ATTACHMENT FOR TRUCKS

Application filed November 21, 1931. Serial No. 576,569.

This invention relates to a loading attachment for trucks which operates from the front of the truck and carries the load over the forepart and cab of the truck, and deposits the load into the truck body rearwardly of the cab, and when not in use, collapses over the cab in an out of the way manner.

It is an object of this invention to provide a loading attachment for trucks of the type mentioned, which may be operated by means of cords or cables operatively connected to a power winch, and manually controlled.

It is also an object of this invention to provide a loading attachment of the type described which may be installed on trucks of various types without extensive alteration thereto, and at a low cost, and which is efficient and reliable in operation.

It is also an object of this invention to provide a loading attachment of the type described which can be disposed when not in use in such a positon as will not increase materially the amount of head room required by the truck.

These and other objects of the invention, its nature, and its composition and arrangement and combination of parts will be readily understood by any one acquainted with the art to which this invention relates upon consulting the following descriptions of the drawings, in which:—

Figure 1 is a general side elevational view of the front part of an automobile truck showing the manner of the installation thereon of one form of the loading attachment.

Figure 2 is a similar side elevational view showing the loading attachment in position to deposit a load into the body of the truck.

Figure 3 is a top plan view of the attachment of my invention shown disposed in the shovelling position.

Figure 4 is a transverse sectional view through one of the shock-absorbing elements of the main swingable arms of the device of the invention.

Figure 5 is an enlarged detail of a portion of the shovel or bucket, showing the cover latching means.

Figure 6 is an enlarged detail of one of the main swinging arms and means carried thereby for cooperation with operating parts carried by the supporting frame of the device.

Figure 7 is an elevational view taken from the right of Figure 6.

Figure 8 is a side elevational view of the break joint of the main swinging arms.

Figure 9 is a view similar to Figure 8 but taken at right angles thereto.

Figure 10 is a side elevational view of an attachment made according to the principles of the invention, but assuming a different form more suitable for installation in heavy trucks.

Figure 11 is a horizontal sectional view taken through the lower part of Figure 10 showing certain operating parts.

Referring to the drawings in detail it will be seen that the device of the invention consists of a frame supported on and attached to the forward part of the truck and over the hood and the cab, and on this frame is swingably supported a shovel structure, which, in one position is disposed forwardly of the truck and close to or in contact with the ground and in the other extreme, disposed back of the cab and over the body of the truck. Means for moving the shovel structure from either of these extremes to the other and to any intermediate position is mounted at the rear of the cab, and manual controls are disposed within the cab.

The numeral 5 refers generally to a truck chassis, the numeral 6 to the hood, the numeral 7 to the cab and the numeral 8 to the body or load carrying receptacle of the truck. The frame 9 consists of a pair of forward uprights 10 secured on the chassis, one on each side of the hood 6, another pair of uprights 11 likewise secured on the chassis, and immediately to the rear of the cab 7. Immediately over the cab, and if desired, secured to the upper portion thereof, is a horizontal braced structure 12 constituting a slide way for the bucket to be described. The horizontal structure 12 may be rectangular in form and composed of vertically spaced horizontal bars 13 braced as indicated at 14, and transversely spaced by cross members 15, or an equivalent structure may be used.

The uprights 10 extend above the structure 12 as shown. An angularly and upwardly directed bracket 15' is secured to project rearwardly from the upper part of the uprights 11 and the rear end portion of the frame 12 as shown. A trip lever 16 pivoted at its lower end as indicated at 17 is secured to the rear portion of the structure 12 for a purpose to be described. The brackets 15' carry each a sheave or pulley 18. Similar pulleys 19 are carried at the upper ends of the uprights 10. The brackets also carry a cross bar 15a therebetween.

The swingable shovel structure consists of a box-like shovel 20 having a cover 21 hinged at 22 to the forward part thereof, maintained closed by a hook 23 mounted on the back wall on a bracket 24 spring urged to cover retaining position by a spring 25 as seen in Figure 5. The hook 23 has an extended portion 26 which is adapted to act rigidly with the remainder of the hook when struck from the upward side in Figure 5 and adapted to yield and be displaced when struck from the opposite side. This element 26 is adapted to strike the cross bar 15a when the shovel travels to the rearward position, so that the hook 26 will be moved from cover retaining position and permit gravitational opening of the cover of the shovel so as to empty the contents thereof into the truck body. Upon the return forwardly of the shovel structure, the element 26 moves out of the way upon striking the cross bar 15a so as not to affect the cover retaining position of the hook 23 which has by that time been spring returned to such cover retaining position. To each side wall of the shovel structure 20 is secured the forward section 27 of a main swingable arm 28. The swingable arm 28 comprises the forward section 28 and the rearward section 29. The rearward section 29 has its rearward end disposed in a socket member 30 so as to act against a spring 31 therein, the spring being adapted to take up unusual shock in case the shovel structure meets with opposition in its forward movement in operating upon material. The sockets 30 receive a pivot shaft 38 mounted in the side members of the chassis as shown. The position of the pivot 38 may be preferably at a point approximately midway between the uprights 10 and the uprights 11. The forward section 27 and the rearward section 29 of the main swingable arm 28 are connected by a break joint generally designated 33 the construction of which will be apparent from an inspection of Figures 8 and 9. A sleeve 34 secured on the meeting end of the section 27 carries a pin 35 which projects on either side thereof as shown, and a sleeve 36 secured on the meeting end of the section 29 carries a latch member 37 which is apertured in a portion which overlaps the sleeve 34 so as to receive an end of the pin 35 when the joint is closed. The sleeves 34, 36 are hingedly secured by means of ears 38 hinged as indicated at 39. Means for unseating the latch member 37 from the pin 35 so that the arm sections may be swung with respect to each other consists of a shaft 40 journaled in brackets 41, the shaft 40 carrying at one end an actuating lever 42 and at the other end a cam 43 cooperating with a pin 44 attached to the latch member 37 and passed freely through the sleeve 36 and the end of the section 29 so as to protrude on the side opposite to the position of the latch member 37. Moving the lever 42 moves the cam 43 against the pin 44 so as to lift the latch 37 from the pin 35 so as to permit opening of the joint.

For returning the bucket or shovel 20 after dumping there is provided at each side a spring 45 connecting the bucket and the section 27. A shaft 46 projects at each side of the hook 23 in position to be engaged by a hook 47 pivoted on each section 27, whereby to hold the bucket properly positioned while the truck is moved forwardly to shovel material. A cable 48 connects the hooks 47 and is led into the cabin and furnishes a means for displacing the hooks 47 from a position within the cab.

For upwardly swinging the shovel structure there is provided at each side thereof a cable or the like 49 which is brought over the pulleys 19 and the pulleys 18 and then downwardly through idler pulleys 50 attached to an intermediate portion of the uprights 11, and from this point the cables are wound upon a winding drum or winch 51 which is carried by the chassis of the truck at the lower rear portion of the cabin as indicated. This winch is provided to be power driven through the agency of a power take-off from the motor of the truck. It is to be observed that the shovelling operation is carried out by positioning the shovel or bucket close to or upon the ground and moving the truck forwardly in the manner of a steam shovel so as to scoop the material to be loaded, so that a quantity thereof is deposited in the bucket or shovel by this movement.

Within the cab an operating lever 52 is pivotally mounted so as to draw upon a cable or connection 53 so as to control a clutch mechanism connected with the winding drum 51 so as to release or engage the same, so as to cause the upward movement or permit the downward movement of the shovel structure in an obvious manner through the connecting cables 49. The trip lever 16 has a cable connection 54 with the clutch mechanism so that as the bucket 20 passes over the rear end of the structure 12 and shaft 62 strikes the trip lever 16, the clutch mechanism will be disengaged as is necessary to prevent further movement beyond this point of the bucket. Mechanism is provided for returning the bucket from the dumping position shown in Figure 2, and this returning mechanism is mounted in connection with the upper ends of the uprights 10 and comprises the shaft 55 upon which is mounted a drum 56 carrying internally coiled springs to resist turning of the drum in one direction, and to accumulate force for rotating the drum in the other direction upon the release thereof. Supported in the inner upper portion of the uprights 10 is a bifurcated member 57 which mounts loosely the shaft or rod 58, the member 57 having the side elevation shown in Figure 6. Carried by the mounting of the member 57 is a brake arrangement indicated at 59 cooperable with the drum 56 so as to control the rotation thereof. Wound upon the drum 56 in a direction opposite to the spring generated direction of rotation thereof is a cable 60 attached to the rod 58. Hooks 61 on the swingable arms 28 carried on a shaft 62 extended therebetween depend therefrom when they are swung into position adjacent the upper end of the uprights 10, and they hook under the bar or rod 58 and carry it out from between the furcations of the bifurcated member 57 rearwardly as indicated in dotted lines in Figure 6 as the shovel structure moves rearwardly toward the dumping position. The hooks 61 retain the bar 58 all the way to the dumping position, and in so doing the drum 56 is rotated against its spring tensioning so as to store up energy, through the agency of the cable 60 connected with the bar 58. The arrangement is such, therefore, that upon release of the clutch mechanism in the winding drum 51, that the spring tension within the drum 56, supposing that the brake 59 is properly released, will cause counter-rotation of the drum 56 so as to wind the cable 60 thereon and retract the bar 58, and consequently the shovel structure with which the hooks 61 thereof have been engaged, and in this way the shovel structure is carried forwardly past dead center, to such a position adjacent the uprights 10 that the shovel structure will gravitate to the downward position shown in Figure 1. However, should it be desired to collapse the shovel or bucket structure so as to rest it upon the forward end of the horizontal structure 12 so as to be out of the way, the joints 33 are broken by means of turning the levers 42, so as to permit the shovel or bucket to gravitate to the dotted line position shown in Figure 1.

It is believed that it will be obvious by throwing in the clutch of the winding drum, the winding drum having been connected with the power take-off of the truck, that the cable 49 will draw the bucket or shovel mechanism from the dotted line position shown in Figure 1 to either of the extreme positions, the break joints then being closed and secured as already described, and that the shovel structure so disposed, may be swung from either extreme position into the other so as, for instance, to shovel material by forward movement of the truck and to carry the filled bucket or shovel over the truck in the manner mentioned so as to dump the material therefrom gravitationally into the body or receptacle 8, the trip lever 16 operating automatically to cut off the power connection so as to stop further swinging of the shovel structure in the rearward dumping position, and employing the brake to control the return of the shovel structure forwardly under the influence of the spring rotated drum 56, so that it will ride to a position from which it may gravitate to the fully extended forward position shown in Figure 1.

A modification suitable for installation on larger trucks and for heavy work is shown in Figures 10 and 11. The installation of the frame 12a together with the uprights 11a the trip lever 16a and other parts will be recognized as the same as obtains in the embodiment of the invention already described. However, in the case of this latter modification, a channeled slide member 63 is attached to the side members of the chassis, and in this slide member is a slide 64 to which is pivoted and which carries the socket member 32 of the swingable arm structure 28. A shaft 65 powered from the winch mechanism has at its outward end a pulley or drum 66 upon which is wound a cable 67 which is passed over a forwardly supported pulley 68 and then secured to the forward side of the slide 64 as shown in Figure 11. Connecting the remaining or rearward side of the slide 64 is a spring 69 connected on a pin 70 attached to the side member of the chassis. Also on the clutch shaft 65 is a clutch spider 71 adapted to expand against the interior of the drum 66 upon which the cable 67 is wound. When the slide 64 is in the forward position it is locked there by a catch 73 which drops down to such position. A cable 74 connects the catch 73 with an operating lever 72 pivoted from the upper portion of the horizontal section 12a of the frame and within the cab. The free end of the lever is connected by a link 75 with a bell crank lever 76 which has its other arm connected by a link 77 with another bell crank lever 78 mounted on the side member of the chassis and the lower part of the upright 11a. As seen in Figure 10 the link 77 is connected with the horizontal arm of the bell crank lever 78 and that the remaining arm thereof is connected by means of a link 79 to a vertically disposed safety trip lever 80 mounted forwardly of the extreme forward position of the slide 64 and adapted to be engaged thereby to enable it to draw upon the bell crank 78 to release the clutch mechanism through the agency of the clutch arm 81, thus preventing over-running of the slide 64 through stopping the forcible rotation of the drum 66 with which the slide moving cable 67 is connected.

The safety lever 80 is provided with an adjustable stud 82 to provide for easy adjustment for smooth action. The spring 69 is extended by the forward movement of the slide 64 and consequently acts when the drum 66 is released, to draw the slide rearwardly to the starting position. It will be obvious that the forward movement of the slides 64 carry the bucket into the material to be shoveled. The hand operated lever 83 is connected by means of a link 84 to a bell crank lever 85 connected with a vertical cable or rod 86 which is connected with the trip lever 16a and likewise with a brake 87 cooperating with the winch mechanism and the clutch releasing member 88 so that operation of either the lever 83 or the trip lever 16a will free the main winding drum 89 so as to cease from swinging the shovel structure upwardly and permit it to stay in the dumping position. The lever 83 may be used to interrupt the upward and rearward travel of the shovel structure at any desired point while the trip lever 16a so acts only when the shovel structure has come to the extreme rearward position.

It is believed that the above is sufficient description to enable any one acquainted with the art to which this invention relates, to understand, make and use the invention, however, it is to be definitely understood that I do not desire to limit the application of this invention to the particular modifications set out herein to illustrate the principles thereof, and any change or changes may be made in materials, and in structure and arrangement of parts, consistent with the spirit and scope of the invention and the claims hereunto appended.

What is claimed is:—

1. The combination of the frame, body and cab of a truck with a loading apparatus comprising, a slideway structure supported above said cab, swingable arms pivotally connected at inner ends to said frame, end sections pivoted on the outer ends of said arms, a bucket carried by said sections, releasable latch mechanism to lock said sections to said arms in extended operative position, means to swing said arms to move said bucket between a forward loading position, a rear dumping position and a position intermediate thereof, and manually operable means connected to said latch mechanism to operate said mechanism and permit the sections to swing relative to the arms whereby the bucket may rest on said slideway when the arms are in an intermediate position.

2. The combination of the frame, a body and cab of a truck with a loading apparatus comprising, a slideway structure supported above said cab, swingable arms pivotally connected at inner ends to said frame, end sections pivoted on the outer ends of said arms, a bucket carried by said sections, releasable latch mechanism to lock said sections to said arms in extended operative position, means to swing said arms to move said bucket between a forward loading position, a rear dumping position and a position intermediate thereof, and manually operable means connected to said latch mechanism to operate said mechanism and permit the sections to swing relative to the arms whereby the bucket may rest on said slideway when the arms are in an intermediate position, the said latch mechanism including a yieldable latch on one of said arms provided with an aperture and a pin on one of said sections receivable in said aperture.

3. The combination of the frame, body and cab of a truck with a loading apparatus comprising, a slideway structure supported above said cab by uprights from said frame, arms pivoted at inner ends to said frame at either side of said cab for swinging movements between forward loading, rear dumping and intermediate positions, end sections pivoted to the outer ends of said arms, latch mechanism to releasably lock the sections to said arms in extended operative position, a drum mounted on one of said uprights, a spring to urge the drum in one direction, a cable around said drum having an inner end fixed thereto, means associated with the free end of said cable engageable by an arm as it swings towards dumping position whereby the drum is rotated against the action of the spring, adjustable brake mechanism associated with said drum and support and a bucket structure carried by said sections.

4. The combination of the frame, body and cab of a truck with a loading apparatus comprising, a slideway structure supported above said cab by uprights from said frame, arms pivoted at inner ends to said frame at either side of said cab for swinging movements between forward loading, rear dumping and intermediate positions, end sections pivoted to the outer ends of said arms, latch mechanism to releasably lock the sections to said arms in extended operative position, a drum mounted on one of said uprights, a spring to urge the drum in one direction, a cable around said drum having an inner end fixed thereto, means associated with the free end of said cable engageable by an arm as it swings towards dumping position whereby the drum is rotated against the action of the spring, adjustable brake mechanism associated with said drum and support and a bucket structure carried by said sections, the said bucket structure including a cover hinged to a receptacle and a releasable hook disposed to abut a part of said slideway structure as the arms move to dumping whereby the cover is released.

5. The combination of the frame, body and cab of a truck with a loading apparatus comprising, a slideway structure supported above said cab, swingable arms pivotally connected at inner ends to said frame, end sections pivoted on the outer ends of said arms, a bucket carried by said sections, releasable latch mechanism to lock said sections to said arms in extended operative position, means to swing said arms to move said bucket between a forward loading position, a rear dumping position and a position intermediate thereof, and manually operable means connected to said latch mechanism to operate said mechanism and permit the sections to swing relative to the arms whereby the bucket may rest on said slideway when the arms are in an intermediate position, the pivotal connections between the inner ends of the arms and frame including sockets oscillatable on a shaft associated with the frame slidably receiving the inner ends of said arms.

6. The combination of the frame, body and cab of a truck with a loading apparatus comprising, a slideway structure supported above said cab, swingable arms pivotably connected at inner ends to said frame, end sections pivoted on the outer ends of said arms, a bucket carried by said sections, releasable latch mechanism to lock said sections to said arms in extended operative position, means to swing said arms to move said bucket between a forward loading position, a rear dumping position and a position intermediate thereof, and manually operable means connected to said latch mechanism to operate said mechanism and permit the sections to swing relative to the arms whereby the bucket may rest on said slideway when the arms are in an intermediate position, the pivotal connections between the inner ends of the arms and frame including sockets oscillatable on a shaft associated with the frame slidably receiving the inner ends of said arms, and yielding devices between the inner ends of said arms and said sockets.

In testimony whereof I affix my signature.
GEORGE LAMBERT.